Feb. 15, 1949.  A. J. CAWLEY  2,461,719
ROAD ENGAGING MEANS FOR AUTOMOBILES
Filed Oct. 25, 1944
Fig.1.
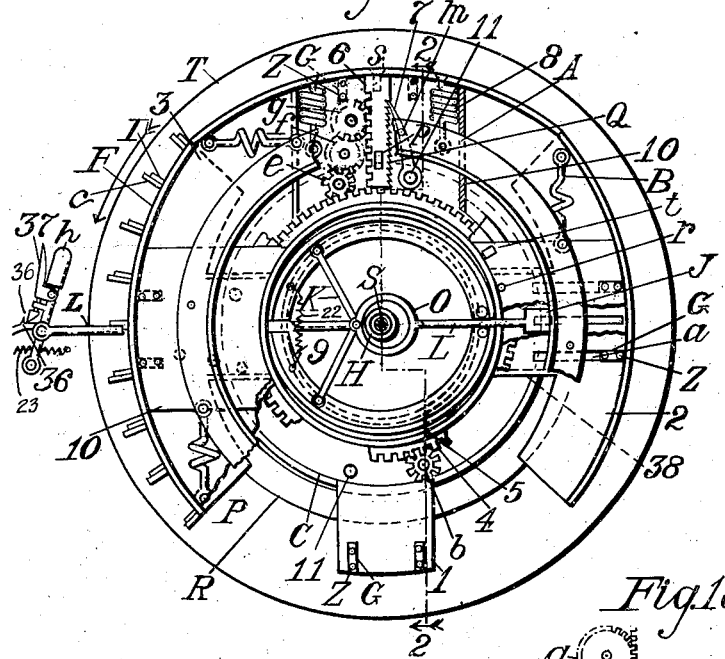
Fig.2.
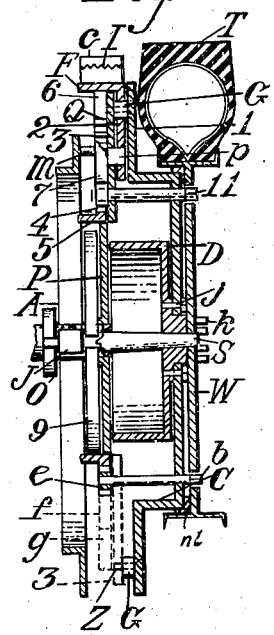
Fig.3.
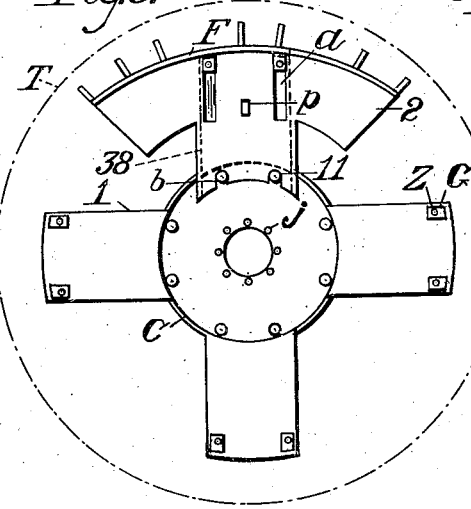
Fig.1a.
Fig.4.
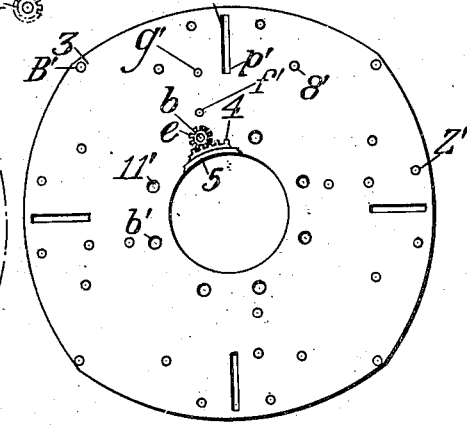
INVENTOR.
Aloysius J Cawley Patented Feb. 15, 1949

2,461,719

UNITED STATES PATENT OFFICE 2,461,719

ROAD ENGAGING MEANS FOR AUTOMOBILES

Aloysius J. Cawley, Pittston, Pa.

Application October 25, 1944, Serial No. 560,280

2 Claims. (Cl. 301—47)

The invention aims to do away with all of the objectionable features of the present day tire chains, which constitute the present day auxiliary road engaging means, in that the road engaging means may be applied or removed in a fraction of a second while the car is in full motion by utilizing the energy of the motor which operates the car.

The invention relates generally to means applied to automobiles or the like, whereby the surface of the tires or wheels which engage with the road may have auxiliary road engaging means brought into cooperative relation therewith, in order to enable the tires to engage with any type of road and thus eliminate, or greatly reduce slipping of the tires on the road surface. By means of the invention, any type of road engaging means may be applied or removed while the car is moving at full speed without the necessity of the driver leaving the car.

Any type of road engaging means may be applied even though the car is stalled with its wheels rotating in ineffective road engagement and consequent slippage. The mere manipulation of a lever at the driver's seat causes the road engaging means best suited to the particular type of road to come into effective road engagement and the car moves readily forward. This is very important for emergency work.

The invention also covers the application of the auxiliary road engaging means while the car is standing by means of a wrench operated while the operator stands beside the car. This wrench may also be used to release the auxiliary road engaging means from road engagement while the car is stationary.

To provide a road engaging means which may be applied to a standard, present-day automobile after a simple machining operation on the brake drum in order to prepare it for attachment thereto.

To provide an auxiliary road engaging means which may be applied by means of friction shoes borne on the stationary backing plate.

Means for releasing the road engaging means from road engagement consisting of a friction ring and means for bringing friction shoes in contact wtih this ring.

An auxiliary road engaging means that is attached to the brake drum and the pressure of the road surface against the auxiliary road engaging means is distributed around the entire periphery of the wheel and road engaging means.

An auxiliary road engaging means and associated wheel which act to reinforce each other, as they are in intimate contact throughout their peripheries.

This application is a continuation-in-part application of my application Serial No. 247,281, filed December 22, 1938, for Road engaging means for automobiles, which has matured into Patent No. 2,377,923 of June 12, 1945.

Those objects are attained by means of the mechanisms illustrated in the accompanying drawings, in which Figure 1 is an elevational view of one modification of the road engaging means applied to an automobile wheel.

Figure 1a is an illustration of a portion of Figure 1.

Figure 2 is a side view of Figure 1 partly in cross-section.

Figure 3 is a more detailed elevational view of a portion of Figure 1.

Figure 4 is a more detailed elevational view of another portion of Figure 1.

Figure 1 illustrates an ordinary automobile wheel, R being its rim and T its tires. The surface of the wheel adjacent the car body is shown in this figure. Figure 2 is a view partly in cross section of Figure 1. Referring to those figures, S represents the shaft, while H is the shaft housing. The brake drum D is mounted upon the shaft S in the conventional manner. The wheel body W is fastened to the brake drum by the bolts k. P is the backing plate, which is mounted in the conventional manner upon the shaft housing H. The regulation brake shoes which make frictional contact with the internal surface of the brake drum D are not illustrated, as they would add nothing to the disclosure. Space is left to amply accommodate them, however, as shown in the drawing.

The auxiliary road engaging means about to be described is demountable, just as the wheels are. In order to apply the auxiliary road engaging means to an ordinary wheel, the wheel W is removed by loosening the bolts k and slipping off the wheel. An additional seat is machined on the surface of the brake drum D to accommodate the cup-like member C. Holes are bored in member C and drum D to accommodate the bolts j. The auxiliary road engaging means is then attached by passing the hole in the center of the cup like member C over the projection on the drum, and secured to its seat by means of the bolts j, as better illustrated in Figure 8. The auxiliary road engaging means includes a supporting frame which consists of the cup-like portion C, which is provided with radial members l, four being shown, but any number desired may be used. Therefore, C and 1 act as a supporting frame for the auxiliary road engaging means. The radial members 1 are provided with holes to accommodate screws Z, which fasten guides G to them. It will be noted that the cup-like member C fits snugly into the hollow of the wheel W, cushioned if desired, by rubber pads $n1$. The radial members 1 may also fit against the tire T. This arrangement causes the pressure of the road surface to be equally distributed over the wheel, giving great strength and yet sufficient resilience. Sliding on the arms 1 are the quadrants 2, each provided with slots $a$, through which project the guides G, which are attached to arms 1', permitting a sliding motion of the quadrants. The quadrants 2 are provided with flanges F bearing any suitable road engaging elements, which may consist of the usual teeth, so-called "rubber chains," etc., but which are here illustrated as metal blades I provided with suitable teeth to which are attached as by means of bolts, etc., the resilient pads $c$. As the quadrants 2 move radially on the arms 1 to which they are held by means of their flanges 38, the resilient pads $c$ first come into road engagement and exert moderate pressure, for instance on wet or slippery concrete pavement. If the latter is coated with a sheet of ice, further outward motion of the quadrants 2 cause the teeth I to penetrate the ice and obtain firm engagement therewith. If the road is coated with soft dirt, mud, or snow, further outward or radial travel of the quadrants 2 cause the teeth I to penetrate very deeply, almost to any desired depth. When there is considerable travel, as in mud or dirt, the blades I come in firm engagement at considerable depth, and thus insure firm engagement.

Each quadrant 2 is provided with a lug $p$, which projects upwards in the drawing. Over the four quadrants 2 is placed the ring like member 3, which is provided with slots $a'$, through which pass the lugs $p$ at $p'$. This ring-like member may be in the form of a circle, or as illustrated in Figures 1 and 4, where the curved surfaces or edges have the same radius of curvature as the periphery of the tire T. This annular member 3 acts to support and guide the quadrants 2, and yet permit their ready sliding to and fro on the arms 1. It also acts to support the flanges F of the quadrants 2, and most important of all, to distribute the pressure of the road surface equally all over the auxiliary road engaging means and its companion wheel and tire. The guides G are secured to the annular member by means of screws or the like Z, passing through the holes Z' therein. Those guides G hold the annular member 3 firmly in place, yet permit the movable quadrants 2 to slide readily to and fro.

It is important to point out that the curvature of the quadrants 2 should be of the same radius of curvature as the periphery of the tire T, as illustrated in Figures 1 and 4, in order that all portions of the road engaging elements will come into uniform road engagement as the wheel rotates. This means that the quadrants and the curved portions of the annular member 3 are really quadrants of the circle represented by the periphery of the tire T.

A bar 6, provided on one side with gear teeth constituting a rack and on the other side with ratchet teeth constituting the ratchet Q, is laid over the annular member 3, and is provided with a slot in which the lug $p$ is fastened by means of a screw or the like, as shown in the upper portion of Figures 1 and 3. This bar 6 is also attached to the flange F by means of a screw, or the like $s$, so that the quadrants 2 are rigidly held in position, yet may slide very readily radially. Wheels $e$, $f$, $g$, of which there are four sets, are shown in engagement with each other. Those wheels are of different diameters, $e$ being much smaller, as illustrated further in Figure 1$a$. The largest of this train of wheels $g$ is in engagement with the rack on bar 6. By making this wheel of larger diameter than the others the latter do not engage with the gear teeth on bar 6. However, the same result can be accomplished by making the wheels of the same diameter and inclining the axis of the gear train at an angle to the axis of the bar 6 so that but one wheel, $g$, will be in engagement therewith. Wheel $e$ is illustrated as being of much smaller diameter than $f$, and the latter of much smaller diameter than $g$, particularly in Figure 1$a$. This arrangement constitutes a virtual jack, by applying energy to wheel $e$, enormous power is applied to the rack on 6. Also, by using three wheels instead of one, engagement of wheel $g$ with the rack teeth on 6 is at a point considerably distant from the end of the bar 6. This permits the bar 6 to come almost in contact with wheel 4 in the "off" position of the road engaging means and also allows a considerable distance of travel of the bar 6, affording a greater penetration of the road engaging means in snow and dirt and also affording a greater removal of the road engaging elements from the surface of the road when not in use. The wheels $e$, $f$ and $g$ are journalled in the annular member 3 and the casing 10. The pawl 7 is fastened by means of the shaft 11 upon the annular member 3. Large gear wheel 4 is placed in engagement with the four wheels $e$ and really needs no further radial support. However, it is shown as supported further by means of the casing 10, which holds it laterally and also by means of the thrust bearings $t$, as shown in Figure 1, which are mounted in the casing 10, and also by the similarly mounted radial bearings $r$, which press against the extending flange or hub of wheel 4. Wheel 4 is therefore, very firmly and yet very movably supported peripherally and needs no central support. It is made hollow and its internal surface 5 constitutes a friction surface which engages with the shoes or friction members 9. The radial and thrust bearings, together with the four wheels $e$ act to eliminate friction from the rotation of the wheel 4. Casing 10 also acts as a further journalling means for the shafts of the wheels $e$, $f$, and $g$. It will readily be seen that, as the car moves, wheel 4 ordinarily rotates with wheel W and tire T. However, if, while the wheel W is rotating, the shoes 9 are brought in contact with wheel surface 5, the variable amount of friction will cause the wheel 4 to be retarded in its motion to a corresponding variable degree, producing a difference in the rate of rotation of wheels W and 4. In other words, the latter rotates relatively to the former, resulting in a corresponding rotation of the wheels $e$, $f$ and $g$, which in turn produces a radial movement of bar 6, together with the quadrants 2 and their road engaging elements, such as I and $c$. Pawls 7 engage with the ratchets Q and act to hold the bars in the position of their farthest travel. A flanged ring A is attached by pivots $m$ to all pawls 7. Springs B, which are fastened to this ring A and to the annular member 3, act to hold the pawls in firm engagement with the ratchets Q. Springs 8, fastened to the annular member and flanges F of the quadrants 2, act to exert a centripetal pull upon the quadrants. The wheel shown in Figure 1 is supposed to be rotating counterclockwise, as indicated by the arrow. It will thus be seen that bars 6 may be held fixedly at any point of travel by means of the pawls 7, and any degree of road engagement desired may thus be obtained. The casing supporting the wheels $e$, $f$ and $g$, bar 6, etc., is illustrated at 10. The ring A is provided with a flanged portion bearing a friction surface which engages with the shoe J, which is mounted upon the end of the rod L. If the wheel is rotating counterclockwise and pressure is applied to J by means of the handle $h$ attached to rod L upon the end of which shoe J is mounted, friction is thus brought to bear upon the surface of ring A and it is more or less prevented from rotating, so that its rotary motion is retarded, giving a clockwise pull upon the ring A, which in turn, pulls on the pawls 7 and disengages them from their ratchets Q, and springs 8 then pull on the movable members and cause them to return to their retracted position. All pawls 7 are released uniformly and simultaneously, due to their being attached to ring A. Also the centripetal return of the movable members 2 etc., is uniform, as they are all equally connected to wheels $e$ and 4. If the car is stalled in soft, such as muddy, road, it is interesting to note that, since in such a situation the wheels rotate without the car moving, the road engaging means is applied by means of the rotating wheels without any trouble whatever. Thus, a stalled car in soft mud may have the road engaging means applied to the extreme degree of travel of the bar 6 with their flanges and road engaging means I and $c$. In such a case, all that is necessary is to push the handle $h$ to the extreme left. Rod L is thereby moved to the left and the levers K, forming a toggle joint, force the shoes 9, which are normally held together by springs 22, with great force against the friction surface 5 of wheel 4, and the road engaging means are applied to the fullest extent. However, if the car starts to move before the extreme travel of the road engaging means is reached, handle $h$ is returned to the neutral position and the degree of road engagement of the engaging means is maintained. If later found unnecessary, pressing the lever to the extreme right causes rod L, which is here shown as provided with a circular or ringlike portion encircling the shaft housing H, to engage shoe J, which is fixedly mounted on the end of the rod L, to engage the friction surface of ring or band A, while wheel W rotates and thus retards the motion of the band, giving a clockwise pull upon it with a corresponding pull upon the pawls 7, bringing about their release from the ratchets Q. It is obvious that if, while the car is moving at a great rate of speed, the lever or handle $h$ is pushed suddenly to the left very far, the road engaging means may be applied too far peripherally, and if the road is hard, unpleasant effects would be produced. However, by simply pressing gently on the handle $h$ just enough friction is produced between shoes 9 and surface 5 to apply just that degree of road engaging means that is best suited to the particular type of road being traversed. In such case, the resilient elements $c$ will come in contact with the road surface with just the right degree of pressure for best engagement. It is important to note that, in such case, the resistance of the road surface to the advance of the element $c$, etc., will be greater than the retarding force produced by friction on the surface 5 by the slight pressure on the handle $h$. However, in order to avoid a too sudden application of the road engaging means to its fullest extent of travel, a stop 36 is formed in the rack which cooperates with the handle $h$, preventing it from moving further. The lever $h$ then must be further released by actuating the catch 37 so as to permit its passage over the stop 36, with the result that the lever may be further pushed to the left, if further application of the road engaging means is desirable. Shoes 9 and surface 5 are shown exaggeratedly separated for purposes of illustration. Attention is again called to the great advantage of applying a comparatively slight pressure between shoes 9 and surface 5, when the road engaging means, in meeting the road surface, is applied to the best degree of road engagement. In such case the resistance to further travel of the road engaging means against the road surface will cause a tight gripping of the road surface, and there will be a slipping of the surface 5 relatively to the shoes 9. Thus, the road gripping means best suited to the particular road is automatically obtained by comparatively light pressure on the handle $h$. If it is wet concrete pavement, the resilient elements $c$ will be applied tightly to the road surface; if an icy pavement, the teeth shown at I will penetrate the ice. The toothed blades I may be made of steel tungstate or similar substance.

The proper degree of road engagement is indicated to the operator by the cessation of skidding, or if the car is stalled in soft road, by its proper movement forward. The surfaces of flange F may be provided with regular lengths of chain, or with pneumatically inflated rubber tubes with specially formed road engaging surfaces.

The handle $h$ may be held in the neutral position, in which neither shoes 9 or J are in contact with their corresponding friction surfaces, by means of two springs 23 fastened to the handle $h$ and pulling in opposite directions. If the road engaging means has been applied, it is then left in the exact position in which it was applied. It will be seen that the road engaging means may be applied or removed in the fraction of a second, thus avoiding many fatal accidents, as for instance, when the car suddenly encounters a slippery pavement while travelling at full speed.

The operation of the handle $h$ in applying the road engaging means is comparable to that of the engineer's valve in the railroad air brake system, in that slight movement of the handle causes the road engaging means to go slowly into engagement. Its action is not like that of a brake on an automobile where constant pressure is necessary on the brake handle or pedal. The pawls 7 act to hold the road engaging means in the same degree of engagement that has been given by operating the handle $h$. Return of the handle to the neutral position does not affect this engagement. To disengage the road engagement, it is only necessary to move handle $h$ to the right from the neutral position, quite similar to the action of the engineer's valve of the air brake system.

The shaft $b$ of wheel $e$ is shown as squared at its end, which projects through the opening in wheel W, as shown at b, Figures 2 and 8. Four such shafts are illustrated, any of which may be used to engage with a wrench o, Figure 10. In this way, the road engaging means may be applied when the wheel is not rotating. It may thus be applied without the use of shoes 9, links K, rod L, handle h, etc. Simply attaching and turning the wrench o causes rotation of shaft b, wheels e, f, and g resulting in peripheral travel of engaging elements c and I. Elements 9, K, L and h could be dispensed with, and still the car would be provided with means of applying the "chains" in a second or two, and without the necessity of jacking up the car.

Figures 1 and 2 illustrate the shafts 11 of pawls 7 as being provided with squared ends, which may be engaged by a wrench through holes in the wheel W. By applying a wrench to those ends after the brakes have been applied, a slight turn will release all of the pawls 7 simultaneously from their ratchets, due to their being all connected to ring A by pivots m, and road engaging means will immediately be returned to nonengagement by springs 8.

Figure 3 illustrates the cuplike member C with its radial arms 1. The bolts attach this to the brake drum by means of the holes shown at j. A quadrant 2 is shown in slidable engagement with one arm 1. Flanges 38 on the quadrant 2 hold 2 in intimate slidable engagement with 1. Ball bearings may be judiciously provided, if desired. Guide G is shown in engagement with the slot a in 2. A lug p for attachment to the bar 6 is shown on the quadrant. The guides G are attached to quadrants 2 and annular member 3 (Figure 4) by the bolts or screws Z. The shafts supporting the pawls 7 are shown at 11; their opposite end is squared for engagement with a crank or wrench. The shaft of the wheels e is illustrated at b; their opposite ends are also squared. Eight holes are illustrated at the center of the element C, but usually six are in practice used. The broken line T indicates the periphery of the tire, and the quadrants 2 have the same radius of curvature.

Figure 1a illustrates the relative diameters of the wheels e, f and g in a general way. This constitutes a veritable jack.

After the quadrants are all placed in position on arms 1, the annular member 3, illustrated in Figure 4, is disposed or placed over them, when the lugs p engage with the slot a' at p' and the bolts Z are passed through holes Z'. The center hole of 3 is of the same diameter as surface 5 of wheel 4, and slightly larger than backing plate P, in order that it may be slipped over it in attaching the auxiliary engaging means to an ordinary automobile. This hole is shown in Figure 4 as being much smaller than it should be relative to the diameter of the member 3. It should be much larger, thus necessitating much less metal in member 3. Ball bearings may be applied at the engaging surfaces of member 3 with wheel 4. Thus wheel 4 is literally floating frictionlessly in position on ball bearings. The periphery of member 3 consists of four quadrants having the same radius of curvature as F. The four slots a' accommodate the lugs p. The squared shafts b pass through the four holes b'. The four holes f' and g' accommodate corresponding shafts of wheels f and g. The eight holes 8' are for the attachment of the retracting springs 8. One of the springs B is attached in hole B'.

Gear wheel 4 is placed in position on the annular member 3, as illustrated in Figures 1 and 3, but more detailed in Figure 4. The shafts b of wheels e are inserted in holes b' and pass through corresponding holes in member C and the squared ends extend beyond that member. The shafts of wheels f and g are inserted in holes f' and g'. The bars 6 are then placed in engagement with wheels g, lugs p and flanges F by screws s. Pawls 7 and their shafts 11 are then placed in position similar to b. Their squared ends protrude through the holes in C, also.

Casing 10 is then placed in position so as to engage the other ends of wheels e, f and g. It is fastened to member 3 by screws, etc., as desired. There is an opening in casing 10 corresponding to the arc described by pivot m on each pawl 7. The pivot m extends above the casing and is attached to ring A. Springs B are then attached to ring A and annular member 3, as illustrated.

The supporting structures of the auxiliary road engaging means should be made of a light, strong alloy, such as Duralumin. This is particularly true of annular member 3, but also true of members C and 10. Those members should also be ribbed for strength and fenestrated for further lightness.

The friction between surfaces 5 and 9 is directly opposed to the resistance of the road surface to the peripheral travel of bar 6 and the road engaging means c, etc. When the "rubber" chain c comes into contact with the concrete road surface, it is met with great resistance. If great pressure is maintained against the surface 5 by means of 9, the "rubber chain" becomes compressed and the teeth of the metal road engaging element I comes into engagement with the road surface, for instance if the concrete is coated with ice. Further pressure would cause the wheel to be raised off and free of the road surface. In other words, there is a balance between the opposed forces consisting on the one hand of the friction between 9 and 5, causing the road engaging element to press against the road surface, and on the other hand of the resistance of the road bed. If the proper degree of friction is maintained, the teeth will engage with the road surface, after the cushions c have been found inadequate. If the road is soft, moderate friction between 9 and 5 causes a further travel peripherally by the road engaging element unresisted into the soft earth or snow until sufficient resistance is encountered to cause the road engaging element to effectively engage, and the car moves forward. This is equally true if the car is standing perfectly still with the road engaging means in ineffective engagement and the wheels rotating. Further pressure on the handle h causes the friction to be maintained until the ineffectively rotating wheels engage as the road engaging means travel peripherally. Thus, the most suitable type of road engaging means is effectively applied.

In another modification, tire T2 is mounted upon a separate wheel, which latter is mounted upon the shaft S, or its disk portion may be mounted upon the wheel W.

Attention is particularly called to the simplicity and great utility of the type of road engaging supporting and releasing and applying means illustrated in Figure 1. Referring to Figure 2, it is readily seen how easily the hollow surface 5 of wheel 4 is slipped opposite to and over the periphery of the backing plate P, while the bolts j fasten its cup-like member C to the seat in the brake drum. The two shoes 9 are then attached to the plate P by means of the two bolts shown at their right extremities in Figure 1. The rods or links K are then attached to 9, and the wheel W is then mounted in the conventional manner. The car is by the above simple operations, taking only a few seconds, provided with a very effective road engaging means.

When the car is stalled in soft mud, or the like, it may not be desirable to apply the road engaging means by rotating the wheels, as a firm foot hold may not thus be possible. In such case, the road engaging means may be applied in road engagement by applying the wrench o to any one of the shafts 4 (squared ends) and causing the road engaging means to come into road engagement while the wheel is stationary, and thus get a very firm footing.

The handle h is of course, at the driver's seat. The rods L may be connected by a cross rod, and a single rod connecting the cross rod and the handle h at the driver's seat, somewhat similar to the old fashioned carriage or wagon brakes.

Having described my invention, I claim as new and desire to secure by Letters Patent:

1. A road engaging apparatus consisting of a rotatable member, and auxiliary road engaging means, means for bringing said auxiliary road engaging means into road engagement and means for releasing said auxiliary road engaging means from road engagement including a wrench engageable element accessible through said rotatable member.

2. A road engaging apparatus consisting of a rotatable member, an auxiliary road engaging means, means for bringing said auxiliary road engaging means into road engagement while said auxiliary road engaging means is stationary including a wrench engageable shaft, means for bringing said auxiliary road engaging means into road engagement while said auxiliary road engaging means rotates, means for releasing said auxiliary road engaging means from road engagement while said auxiliary road engaging means rotates, and means for releasing said auxiliary road engaging means from road engagement while said auxiliary road engaging means is stationary.

ALOYSIUS J. CAWLEY.

REFERENCES CITED

The following references are of record in the file of this patent:

UNITED STATES PATENTS

| Number | Name | Date |
| --- | --- | --- |
| 1,988,447 | Gutmann | Jan. 22, 1935 |
| 2,223,246 | Coletti | Nov. 26, 1940 |
| 2,228,423 | Ticktin | Jan. 14, 1941 |
| 2,377,923 | Cawley | June 12, 1945 |